United States Patent [19]

Hardt

[11] Patent Number: 5,033,270
[45] Date of Patent: Jul. 23, 1991

[54] ROTARY BELLOWS

[75] Inventor: Lee R. Hardt, Ridgecrest, Calif.

[73] Assignee: The United States of America as represented by the Secretary of the Navy, Washington, D.C.

[21] Appl. No.: 593,415

[22] Filed: Oct. 1, 1990

[51] Int. Cl.$^5$ .................. F01B 29/08; F02N 13/00
[52] U.S. Cl. .................................. 60/632; 92/31; 92/34; 92/36; 92/89; 92/90; 92/91
[58] Field of Search .................. 60/632; 92/31, 34, 36, 92/48, 89, 90, 91, 92, 103 M, 116

[56] References Cited

U.S. PATENT DOCUMENTS

| | | | |
|---|---|---|---|
| 2,376,635 | 5/1945 | Tellkamp | 92/91 |
| 2,522,401 | 9/1950 | Rava | 92/90 |
| 2,563,899 | 8/1951 | Wiancko | 171/119 |
| 2,575,071 | 11/1951 | Rockwell | 60/632 |
| 2,677,393 | 5/1954 | Cornelius | 92/90 |
| 2,877,326 | 3/1959 | Bourns | 201/48 |
| 3,063,620 | 11/1962 | Black | 92/90 |
| 3,066,853 | 12/1962 | Landenberger | 230/160 |
| 3,280,632 | 10/1966 | Harland et al. | 73/418 |
| 3,453,967 | 7/1969 | Spurlocki et al. | 92/90 |
| 3,463,011 | 8/1967 | Wehde et al. | 73/418 |
| 3,530,719 | 9/1970 | Altfillisch | 73/398 |
| 3,613,455 | 10/1971 | Hightower et al. | 73/418 |
| 4,058,855 | 11/1977 | Runge | 92/31 |
| 4,108,050 | 8/1978 | Paynter | 92/48 |
| 4,751,868 | 6/1988 | Paynter | 92/92 |

Primary Examiner—Edward K. Look
Assistant Examiner—Thomas Denion
Attorney, Agent, or Firm—Sol Sheinbein; Melvin J. Sliwka; Stephen J. Church

[57] ABSTRACT

An actuator, which directly converts fluid pressure to rotary movement, has a generally cylindrical and helically fluted circumferential wall, an end wall bearing an output member, and a fixed opposite end wall. The actuator may be a one-shot device providing substantial torque and driving the output member through a relatively wide angle by having a pyrotechnic gas generating charge mounted inwardly of the fixed end wall and by exceeding the elastic limit of the circumferential wall which is metallic to so as to withstand pyrotechnically generated gas.

5 Claims, 1 Drawing Sheet

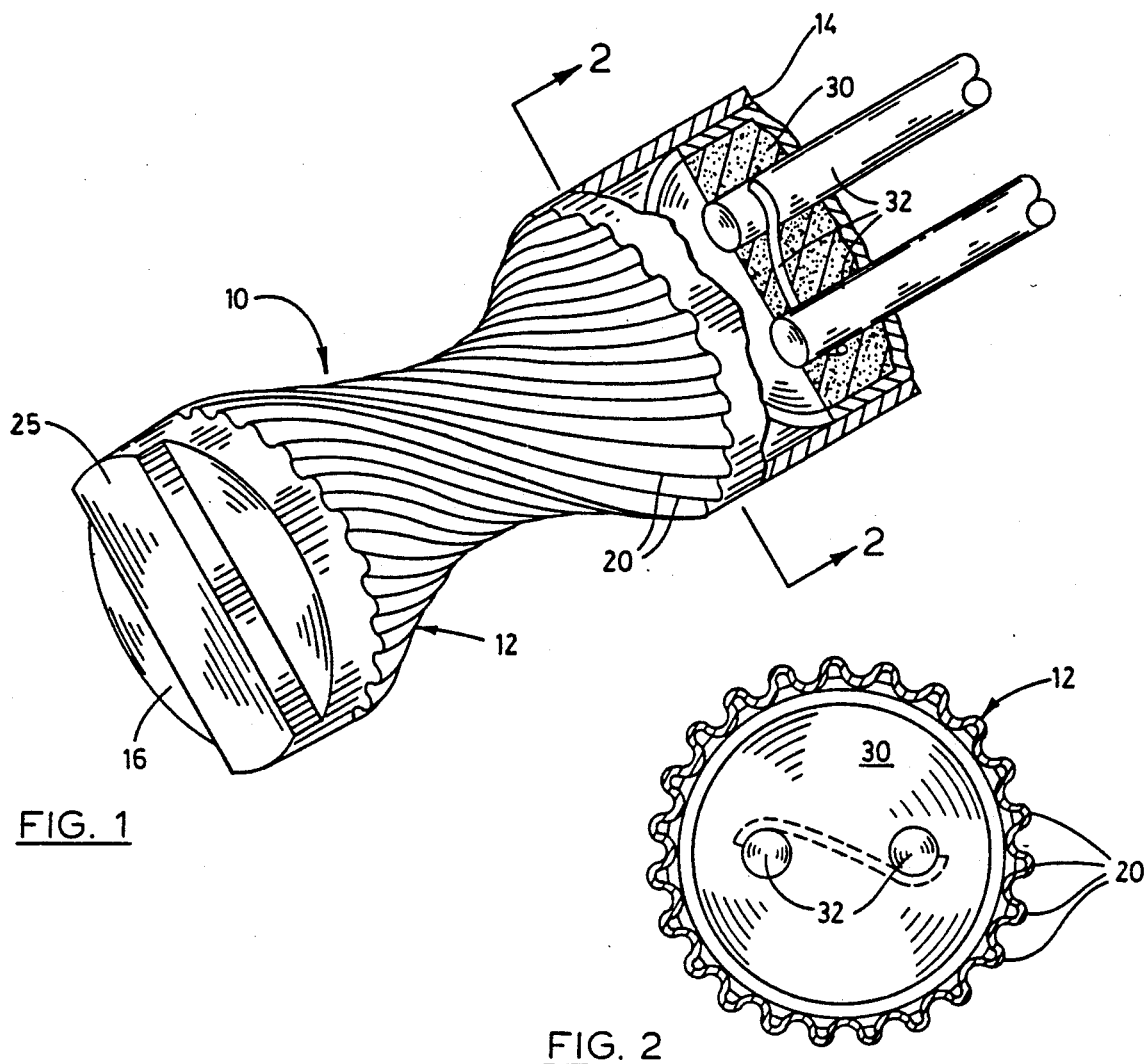
FIG. 1
FIG. 2
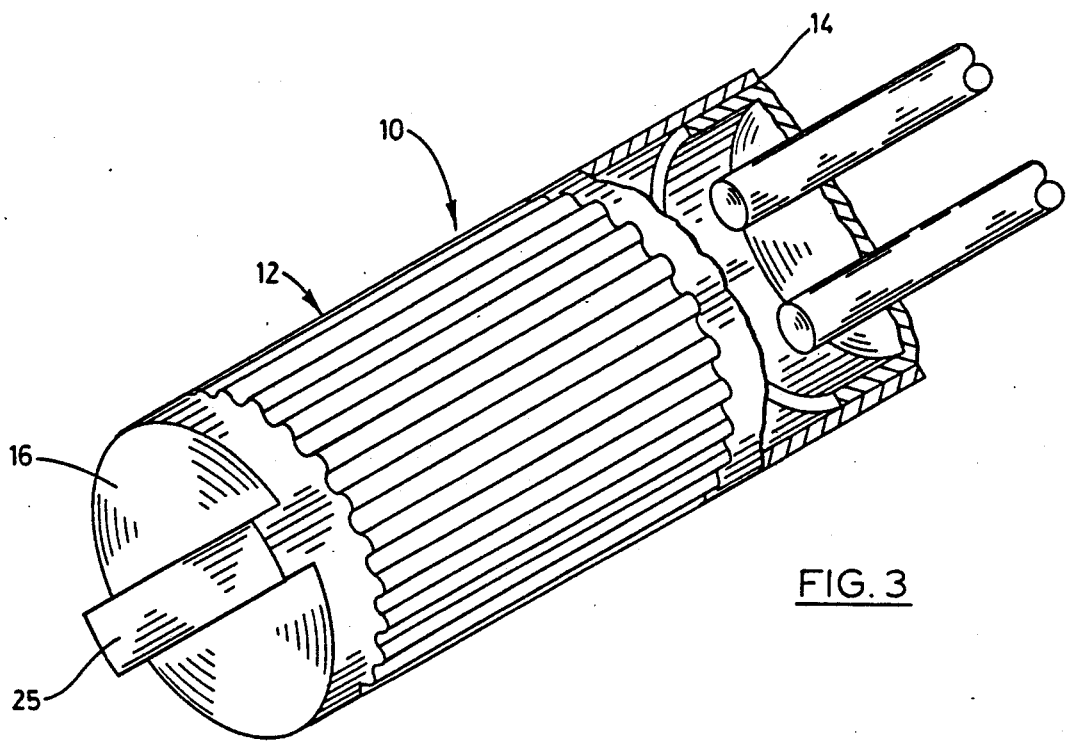
FIG. 3

ROTARY BELLOWS

BACKGROUND OF THE INVENTION

1. Field of the Invention

The present invention pertains to the field of expansible chamber motors or devices having a bellows and having a shaft axis parallel to the axis of the working member.

2. Description of the Related Art

Rotary actuators in which an output member is driven to rotate through a portion of a circle by fluid pressure to actuate a valve or the like are well-known. Some prior art devices of this kind use a linearly moving piston with a crank, gears, or a swashplate to convert the piston motion into the desired rotary motion and are relatively bulky, heavy, and expensive because of the motion converting elements and the necessary machine work and dynamic fluid seals. Other prior art devices of this kind use pivoting vanes and are simpler and more compact, but still require machine work and fluid seals. These disadvantages are particularly serious where only one-shot operation is required. It is, therefore, highly desirable to provide an actuator that directly converts fluid pressure into rotary motion and that does not require machining or fluid seals.

Some of the disadvantages of weight, bulk, and expense of fluid pressure driven actuators are avoided, particularly for one-shot operation, in bellows devices pressurized by pyrotechnically generated gas which may be provided by a charge and igniter integrally constructed with the bellows. However, such bellows devices heretofore have only provided linear motion.

A bellows device for direct conversion of fluid pressure to rotary motion is shown in U.S. Pat. No. 4,108,050 to Paynter. This rotary operator device uses a thin shell of elastomeric material with inextensible strands bonded to the shell and, together with the shell, fixed to coupling members at the shell ends. The shell and strands are twisted into a helically fluted configuration so that, when the shell is pressurized, the shell bows outward and the strands urge the coupling members to rotate relatively to each other. The rotary operator includes an external frame or an internal axle, apparently to keep the flexible shell and strands from buckling. In relation to the linear motion bellows devices mentioned above, the construction of this rotary operator is more complex and it is bulkier and heavier. Also, the shell of elastomeric material is stated to be for operation to 220° F. (104° C.) and is thus not well-suited to the temperatures of pyrotechnically generated gas.

For pressure measurement, it is well-known to use a straight, metallic Bourdon tube twisted about its axis, the tube tending to untwist when subjected to an internal pressure to be measured. Such a tube may be a twisted, flattened tube or may have helical flutes. The construction of such tubes is optimized for pressure measurement and the elastic limit of the tube cannot be exceeded in normal operation. As a result, such tubes typically have motion limited to a small angle, only provide a minuscule torque, and are axially bulky since their axial length is relatively great in relation to their diameter.

SUMMARY OF THE INVENTION

A one-shot actuator, which has an output member rotationally 10 driven by direct conversion of fluid pressure to rotary movement, includes a generally cylindrical bellows having a twisted or helically fluted circumferential wall and includes a pair of opposite end walls fixed to the circumferential wall. One of the end walls is fixed and the other is free to rotate relative to the fixed wall as the circumferential wall untwists when the bellows is internally pressurized. A pyrotechnic gas generating charge may be disposed within the bellows to directly pressurize the a circumferential wall, the circumferential wall being metallic to withstand the temperature of the pyrotechnically generated gas and having its elastic limit exceeded so that the output member is driven with substantial torque and through a relatively wide angle.

An object of the present invention is to provide a rotary actuator which is motivated by pressurized fluid, which is compact, light in weight, and inexpensive, and which provides substantial torque and rotary movement through a relatively large angle.

Another object is to provide such an actuator adapted to one-shot operation by pyrotechnically generated gas.

Still another object is to provide such an actuator which does not involve dynamic fluid seals.

Yet another object is to provide an actuator having the above and other advantages which is simple in construction and directly converts fluid pressure into rotary motion.

BRIEF DESCRIPTION OF THE DRAWINGS

Other objects, advantages, and novel features of the present invention will become apparent from the following detailed description when considered with the accompanying drawings in which:

FIG. 1 is an isometric view of a rotary bellows embodying the present invention, the bellows being in an unactuated configuration and being partially sectioned to show the interior;

FIG. 2 is a transverse section of the rotary bellows of FIG. 1 taken on line 2—2 thereof; and FIG. 3 is a view similar to FIG. 1 showing the bellows in an actuated configuration.

DETAILED DESCRIPTION

The features of the present invention will be apparent from the Figures which show a rotary bellows or rotary actuator embodying the principles of the present invention. The actuator has a cylindrical bellows 10 formed by a cylindrical circumferential wall 12, a stationary axial end portion or wall 14, and an opposite, rotating axial end portion or wall 16. End portions 14 and 16 are disposed oppositely of wall 12 at the opposite ends thereof, each end portion being fixedly connected to and closing the corresponding axial end of the cylindrical wall.

Cylindrical wall 12 has a plurality of helical flutes or corrugations 20 which are twisted about and extend along the axis of wall 12 when the bellows 10 is in an unactuated configuration as shown in FIG. 1. The helically fluted configuration of wall 12 may be obtained from an initial linearly fluted and substantially fluted configuration of the wall, similar to that of FIG. 3, by twisting the wall from its initial configuration so that the elastic limit of the wall material is exceed until the wall assumes and will remain in a "waisted" configuration such as that shown in FIG. 1.

Rotatable end portion 16 bears a rotational driving element, typified by a transversely extending lug 25, fixedly mounted on portion 16 oppositely of wall 12. Lug 25 serves to impart rotary motion of portion 16 to a driven element, not shown, such as a valve stem or the like to be rotationally driven by a substantial torque through a predetermined angle about the axis of wall 12. End portion 14 is connected in any suitable manner, which depends on the nature of the driven apparatus and forms no portion of the subject invention, to a body or the like of the apparatus.

As shown in FIG. 1, the actuator of the present invention, prior to actuation, has a pyrotechnic gas generating charge 30 mounted on end portion 14 within bellows 10 and centrally of the helically fluted cylindrical wall 12. Portion 14 typically has a well-known construction depicted in the Figures, this construction including portion 14 being copulate to receive charge 30 and including a bridgewire igniter 32 extending through portion 14 for electrical ignition of this charge.

It is evident that ignition of charge 30 provides pressurized hot gas internally of bellows 30, this gas pressurizing the volume within bellows 10 defined by cylindrical wall 12 and end portions 14 and 16. It is evident that, following such ignition, wall 12 and its flutes 20 are subjected to the high temperature and erosive and corrosive action of such gas and other combustion products from charge 30. Wall 20 is, therefore, constructed of a material such as brass, copper, or steel which is flexible, for reasons subsequently apparent, and which is resistant to pyrotechnically generated gas and heat from charge 30.

Pressurized, pyrotechnically generated gas from charge 30 expands bellows 10 axially from its FIG. 1 configuration towards its FIG. 2 configuration, so that flutes 20 untwist and urge end portions 14 and 16 into relative rotational movement about the axis of wall 12 and through a predetermined angle evident from the relative positions of lug 25 in FIGS. 1 and 2. It is evident that, for such expansion and rotational movement, charge 30 may be selected to provide gas at a pressure generating a desired torque for application to a driven device by lug 25, thereby directly converting the fluid pressure of gas within bellows 10 into torque provided by lug 25 and doing useful work on a device driven by the lug. Since this pressure returns wall 12 to a conformation similar to its above described initial and untwisted conformation, it will be apparent that the force required to generate this torque exceeds the elastic limit of wall 12 so that the rotary bellows or actuator of the present invention is effective for one-shot operation.

Obviously, many modifications and variations of the present invention are possible in light of the above teachings. It is, therefore, to be understood that the invention may be practiced within the scope of the following claims other than as specifically described herein.

What is claimed is:

1. An actuator for performing useful work on a driven device by direct conversion of fluid pressure to a torque exerted through a predetermined angle about a predetermined axis, the actuator comprising:

a cylindrical bellows having a plurality of helical flutes extending along said axis and having a pair of end portions disposed axially oppositely of said flutes;

means for providing pressurized fluid internally of said bellows for expansion thereof so that said flutes urge said end portions into relative rotational motion about said axis and through said angle; and rotational driving means mounted on one of said end portions for imparting said motion to said driven device.

2. The actuator of claim 1 wherein said means for providing pressurized fluid is a pyrotechnic gas generating charge disposed within said bellows and said flutes are constructed of material resistant to pyrotechnically generated gas and heat from said charge.

3. The actuator of claim 1 wherein said flutes are constructed of a material having a predetermined elastic limit and said mean for providing pressurized fluid provides said fluid at pressure generating said torque with a force that exceeds said elastic limit so that said actuator is a one-shot actuator.

4. The actuator of claim 1 wherein said means for providing pressurized fluid is a pyrotechnic gas generating charge disposed within said bellows and said flutes are constructed of material which is resistant to pyrotechnically generated gas and heat from said charge and which has a predetermined elastic limit, said pyrotechnic charge providing pressurized fluid at a pressure generating said torque by force exceeding said elastic limit.

5. A one-shot rotary actuator comprising:

a pyrotechnic gas generating charge;

a cylindrical wall having a predetermined axis and circumscribing said charge, said cylindrical wall being constructed of flexible metallic material which has a predetermined elastic limit and which is resistant to pyrotechnically generated gas and heat from said charge, said cylindrical wall having a plurality of corrugations twisted helically along said axis, a first axial end, and a second axial end opposite said first axial end;

a first end wall closing said first axial end and fixedly connected thereat to said cylindrical wall, said charge being mounted on said first end wall;

a second end wall closing said second axial end and fixedly connected thereat to said cylindrical wall;

rotational driving means fixedly mounted on said second end wall oppositely of said cylindrical wall; and means extending through said first end wall for igniting said charge to pressurize a volume defined by said cylindrical wall and said end walls by said pyrotechnically generated gas from said charge, so that said cylindrical wall is extended axially and said corrugations are untwisted with a force exceeding the elastic limit of said material urging said second end wall and said driving means to rotate about said axis relatively to said first end wall.

* * * * *